(12) United States Patent
Consales

(10) Patent No.: US 10,611,688 B2
(45) Date of Patent: Apr. 7, 2020

(54) SELF-LEVELING CONCRETE

(71) Applicant: Saint-Gobain Centre De Recherches Et D'Etudes Europeen, Courbevoie (FR)

(72) Inventor: Thierry Claude Consales, Pernes les Fontaines (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 291 days.

(21) Appl. No.: 14/380,971

(22) PCT Filed: Mar. 6, 2013

(86) PCT No.: PCT/IB2013/051768
§ 371 (c)(1),
(2) Date: Aug. 26, 2014

(87) PCT Pub. No.: WO2013/132442
PCT Pub. Date: Sep. 12, 2013

(65) Prior Publication Data
US 2015/0047534 A1    Feb. 19, 2015

(30) Foreign Application Priority Data

Mar. 7, 2012 (FR) ...................... 12 52083

(51) Int. Cl.
| | | |
|---|---|---|
| C04B 28/02 | (2006.01) |
| C04B 28/06 | (2006.01) |
| C03B 5/43 | (2006.01) |
| C04B 35/626 | (2006.01) |
| C04B 35/63 | (2006.01) |
| C04B 35/117 | (2006.01) |
| C04B 35/111 | (2006.01) |
| C04B 111/00 | (2006.01) |
| C04B 111/10 | (2006.01) |
| C04B 111/62 | (2006.01) |

(52) U.S. Cl.
CPC ................ *C04B 28/02* (2013.01); *C03B 5/43* (2013.01); *C04B 28/06* (2013.01); *C04B 35/111* (2013.01); *C04B 35/117* (2013.01); *C04B 35/6263* (2013.01); *C04B 35/62665* (2013.01); *C04B 35/6303* (2013.01); *C04B 2111/00431* (2013.01); *C04B 2111/10* (2013.01); *C04B 2111/62* (2013.01); *C04B 2235/3208* (2013.01); *C04B 2235/3222* (2013.01); *C04B 2235/3244* (2013.01); *C04B 2235/3418* (2013.01); *C04B 2235/447* (2013.01); *C04B 2235/526* (2013.01); *C04B 2235/5212* (2013.01); *C04B 2235/5427* (2013.01); *C04B 2235/5436* (2013.01); *C04B 2235/5445* (2013.01); *C04B 2235/5472* (2013.01); *C04B 2235/72* (2013.01); *Y02W 30/94* (2015.05)

(58) Field of Classification Search
USPC ...... 65/347, 374.13; 501/102, 133, 103, 105
See application file for complete search history.

(56) References Cited

U.S. PATENT DOCUMENTS

| | | | | |
|---|---|---|---|---|
| 5,858,900 A | * | 1/1999 | Azizian | .................. C04B 35/66 501/127 |
| 7,074,733 B2 | * | 7/2006 | Guigonis | ................ C04B 35/66 501/105 |
| 2011/0219987 A1 | * | 9/2011 | Consales | .................. C03B 5/43 106/802 |

FOREIGN PATENT DOCUMENTS

FR    2937636 A1    4/2010

OTHER PUBLICATIONS

"Scimos M". Saint Gobain. Nov. 11, 2006. Retrieved from https://web.archive.org/web/20061111162739/http://www.saint-gobain-tm.com/en/scimos/alumina/scimos_m.html.*
Schacht, Charles A. "Refractories Handbook". 2004. pp. 101-102.*
International Search Report dated Aug. 6, 2013 for PCT/IB2013/051768.

* cited by examiner

*Primary Examiner* — Shuangyi Abu Ali
(74) *Attorney, Agent, or Firm* — Cooper Legal Group, LLC; Ronald M. Kachmarik

(57) ABSTRACT

The invention relates to uniformed concrete comprising, in percentages by weight, (d) 87% to 98% of particles comprising more than 90 wt.-% alumina, (c) 1% to 7% silica fume particles, (f) 1% to 8% particles of a hydraulic cement, the fraction of said particles having a size less than 40 μm being distributed as follows, in percentage by weight in relation to the weight of the unformed concrete:
  fraction <0.5 μm: ≥4%,
  fraction <2 μm: ≥5%,
  fraction <10 μm: ≥19%,
  fraction <40 μm: 34%-52%,
  fraction between 2 μm and 40 μm: 26.5%-34%,
the concentration of $ZrO_2$, in percentage by weight on the basis of the uniformed concrete, being less than 2%, and the concentration of organic fibres, in percentage by weight on the basis of the uniformed concrete, being less than or equal to 0.03%.

19 Claims, No Drawings

SELF-LEVELING CONCRETE

TECHNICAL FIELD

The present invention relates to an unshaped concrete intended in particular for the production of a floor of a glass furnace. The invention also relates to a process for the manufacture of a cured concrete starting from this unshaped concrete.

STATE OF THE ART

The glass industry generally uses, for the construction of its furnaces, refractory products which are fused and cast or obtained by sintering, which products are highly resistant to corrosion by the glass and exist in the form of blocks or slabs.

The infiltration of glass between the slabs of the floors of glass furnaces results in the corrosion of the materials used to form the layer underlying the slabs, known as "screed", and then the corrosion of the slabs themselves. In order to limit the infiltration of molten glass between the slabs, a fresh concrete can be poured into order to grout the slabs.

Patent FR-B-2 458 520 describes an unshaped concrete intended for the manufacture of such concretes. This unshaped concrete, based on particles of a fused-cast refractory material comprising a glassy matrix, is widely used. The fresh concrete obtained exhibits, however, the disadvantage of not being able to be pumped with pumps producing suction pressures of less than or equal to 180 bar.

Pumpable fresh refractory concretes are used for the grouting of the blocks of furnaces for the smelting of metals. The constraints in this application are, however, very different from those encountered in the application to glass furnaces. The conditions for the corrosion of the furnaces by a molten glass or by a molten metal are also different. Some impurities, tolerated in the furnaces for the smelting of metals, are unacceptable for the manufacture of glass. In particular, the refractory materials used in glass furnaces must not generate defects such as the release of stones by fragmentation of the refractory material in the molten glass bath or the production of bubbles. A refractory concrete intended for a furnace for the smelting of metals may therefore not be used a priori for a glass furnace.

FR 2 832 403 describes a fresh concrete which can be used in glass furnaces and which can be easily pumped.

The manufacture of a cured concrete from the unshaped concrete described and claimed in FR 2 832 403 conventionally requires activation by an addition of water, so as to form a fresh concrete, and then, after pouring the fresh concrete, the application of vibration, generally using a vibrating screed board. This vibration operation may be lengthy.

This operation is also tricky and requires a particular know-how. This is because a vibration which is not carried out uniformly may result in segregation in the fresh concrete poured and consequently in cracks during the drying or during the heat-up.

This problem is all the more critical when the fresh concrete poured covers a large surface area.

FR 2 937 636 describes a fresh concrete which may be used in glass furnaces and which exhibits a self-leveling nature by virtue of the presence of zirconia in the fraction of the particles of the unshaped concrete having a size of less than 10 µm, in an amount of between 35% and 75% by weight of said fraction. However, this concrete may result in the presence of defects, such as stones and cords, in the glass.

For some types of glasses, in particular for high quality glasses, for example extra-white soda lime glasses, such defects have to be avoided.

There also exists a need for an unshaped concrete which makes it possible to manufacture an easily pumpable fresh concrete, not requiring a vibration operation in order to be laid and not resulting in segregation, and which makes it possible to manufacture a cured and sintered concrete suitable for the manufacture of a high quality glass.

The present invention is targeted at meeting these requirements, at least partially.

SUMMARY OF THE INVENTION

The invention provides an unshaped concrete, intended in particular for the production of a floor of a glass furnace, comprising, as percentages by weight, (a) 87% to 98% of particles comprising more than 90% by weight of alumina,
(b) 1% to 7% of particles of silica fume,
(c) 1% to 8% of particles of a hydraulic cement, the fraction of said particles ((a)+(b)+(c)) having a size of less than 40 µm being distributed, as percentages by weight with respect to the weight of the unshaped concrete, in the following way:

fraction <0.5 µm: ≥4%,
fraction <2 µm: ≥5%,
fraction <10 µm: ≥19%,
fraction <40 µm: 34%-52%,
fraction of between 2 µm and 40 µm: 26.5%-34%, the content of $ZrO_2$, as percentage by weight on the basis of the unshaped concrete, being less than 2% and the content of organic fibers, as percentage by weight on the basis of the unshaped concrete, being less than or equal to 0.03%.

As will be seen in more detail in the continuation of the description, a fresh concrete manufactured from such an unshaped concrete is pumpable with suction pressures of less than or equal to 180 bar, "self-leveling", that is to say that it can be laid without a vibration operation, and does not result in harmful segregation.

Finally, the cured concrete obtained from this fresh concrete exhibits a satisfactory dilatometric behavior. On contact with molten glass, it generates only a few or no defects in the glass. It is therefore perfectly suited to being used for the production of floors of a glass furnace.

The unshaped concrete can also comprise one or more of the following optional characteristics:

The hydraulic cement constitutes from 3% to 6% of the weight of the unshaped concrete.

The particles of the unshaped concrete are distributed in the following way, as percentages by weight:

fraction <0.5 µm: ≥5%, preferably ≥6% and/or ≤8%, preferably ≤16%, and/or fraction <2 µm: ≥7.5%, preferably ≥8%, preferably ≥10% and/or preferably ≤15%, preferably ≤13%, and/or fraction <10 µm: ≥25%, preferably ≥27% and/or preferably ≤40%, preferably ≤35%, and/or fraction <40 µm: ≥35%, preferably ≥37% and/or preferably ≤50%, preferably ≤47%, preferably ≤43%, and/or fraction of between 2 µm and 40 µm: ≥27% and/or ≤32%, preferably ≤30%.

The maximum size of said particles ((a)+(b)+(c)) is less than or equal to 10 mm.

The fraction of said particles ((a)+(b)+(c)) with a size of less than 500 μm represents more than 50% of the weight of said unshaped concrete.

The fraction of said particles ((a)+(b)+(c)) with a size of between 40 μm and 500 μm is between 8% and 25%, with respect to the weight of said unshaped concrete.

The unshaped concrete exhibits a $ZrO_2$ content of less than 1.5%, preferably less than 1%, preferably less than 0.5%.

The unshaped concrete exhibits the following composition by weight, for a total of more than 95%:

$Al_2O_3$: 81.5%-98.5%, preferably ≥93%, and/or ≤97%
$SiO_2$: ≥0.8%, preferably ≥1.5%, and/or ≤4%.

The unshaped concrete comprises a surface-active agent, preferably between 0.075% and 1% of a surface-active agent.

The surface-active agent is a modified polycarboxylate ether.

The unshaped concrete comprises a setting accelerator.

The invention also relates to a fresh concrete, to a cured concrete and to a cured and sintered concrete, in particular in the form of a floor of a glass furnace, which are obtained from an unshaped concrete according to the invention.

The invention also relates to a glass furnace comprising a cured and sintered concrete according to the invention, in particular in a region in which this concrete is in contact with molten glass, in particular with a high-quality glass, such as an extra white soda lime glass. A cured and sintered concrete according to the invention can in particular be used as jointing material, in particular in order to grout blocks or slabs of a floor, as underlayer of a floor or in the form of a block or of a slab.

The invention also relates to a process for the manufacture of a cured concrete, comprising the following successive stages:

1) preparation of an unshaped concrete according to the invention;
2) activation of said unshaped concrete, so as to obtain a fresh concrete;
3) laying said fresh concrete;
4) curing said fresh concrete, so as to obtain a cured concrete;
5) sintering said cured concrete.

Preferably, in stage 1), use is made, as source of silica fume, of a starting material comprising more than 90% of silica by weight, being provided in the form of a powder, the particles of which have a size of between 0.1 and 5 μm and a median size of less than 1 μm, indeed even less than 0.6 μm, such as the silica fume sold by the Société Européenne des Produits Réfractaires.

Preferably, in stage 2), said unshaped concrete is activated by adding thereto an amount of water preferably greater than 5%, or greater than 6%, and/or of less than 9%, less than 8%, less than 7%, preferably of between 5.5% and 6.9%, by weight, with respect to the weight of said unshaped concrete.

Preferably, in stage 3), the fresh concrete is pumped by means of a pump producing a suction pressure of less than or equal to 180 bar and/or is transported to the pouring site by flowing, by gravity, in a shute.

In stage 3) the fresh concrete may be poured so that the cured concrete constitutes a floor of a glass furnace.

Preferably, the fresh concrete is poured. Preferably, it is not subjected to any vibration operation before it is cured.

Preferably, in stage 5), the cured concrete is sintered at a temperature between 1000° C. and 1500° C., preferably under air, preferably at atmospheric pressure. The sintering time is adjusted as a function of the dimensions of the product to be sintered. The duration of the sintering stationary phase is generally between 1 and 20 hours, preferably between 5 and 10 hours. In the applications where, in its working position, the cured concrete may be subjected to heating conditions capable of sintering it, the cured concrete may be put into position without having been sintered, and then sintered in situ.

DEFINITIONS

The term "unshaped concrete" is understood to mean a particulate mixture capable of setting solid after activation.

The activation is a process of setting solid. The activated state results conventionally from a wetting of an unshaped concrete with water or another liquid. During this process, a wet unshaped concrete is referred to as "fresh concrete".

A solid mass obtained when a fresh concrete sets solid is referred to as "cured concrete". A cured concrete is conventionally composed of an assembly of coarse particles bonded by a matrix.

A hydraulic cement or "hydraulic binder" is a binder which, during the activation, brings about hydraulic setting and curing, generally at ambient temperature.

The "size" of the particles is given conventionally by a particle size distribution characterization provided by a laser particle sizer, for example from Horiba.

It is clear that the particles having a size of less than 10 μm (which constitute the "fraction <10 μm") are included in the 34% to 52% of the particles having a size of less than 40 μm, that the particles having a size of less than 2 μm are included in the particles having a size of less than 40 μm and in those having a size of less than 10 μm, and the like.

What is called "median size" of an assembly of particles, denoted $D_{50}$, is the size which divides the particles of this assembly into first and second populations equal in weight, these first and second populations comprising only particles exhibiting a size respectively greater than or less than the median size.

What is called "maximum size" is the 99.5 percentile ($D_{99.5}$) of said unshaped concrete.

The term "impurities" is understood to mean the inevitable constituents, unintentionally and necessarily introduced with the starting materials or resulting from reactions with these constituents. The impurities are not necessary constituents but only tolerated constituents. Preferably, the amount of the impurities is less than 2%, less than 1%, less than 0.5%, indeed even substantially zero.

When reference is made to $ZrO_2$ or to zirconia, it should be understood that this means $ZrO_2$ and the traces of $HfO_2$. This is because a small amount of $HfO_2$, chemically inseparable from $ZrO_2$ in a melting process and exhibiting similar properties, is always naturally present in zirconia sources at contents generally of less than 2%. Hafnium oxide is then not regarded as an impurity.

All the percentages of the present description are percentages by weight, unless otherwise indicated.

DETAILED DESCRIPTION

Nature of the Particles

Preferably, the sum of the assemblies (a), (b) and (c) represents more than 95%, preferably more than 97%, preferably more than 98%, indeed even more than 99%, of the weight of the unshaped concrete.

Preferably, the zirconia content of the unshaped concrete, as percentage by weight on the basis of the weight of the unshaped concrete, is less than 1.5%, preferably less than 1%, indeed even less than 0.5%, and indeed even substantially zero. In one embodiment, the zirconia is an impurity, that is to say is not deliberately added.

Preferably, the unshaped concrete exhibits the following composition by weight, for a total of more than 95%, preferably for a total of more than 97%, preferably for a total of more than 98%, indeed even for a total of more than 98.9%:

$Al_2O_3$: 81.5% -98.5%
$SiO_2$: 0.8%-7%.

Preferably,
$Al_2O_3$: ≥85%, preferably ≥87%, preferably ≥90%, preferably ≥92%, preferably ≥93%, and/or ≤97%, and/or
$SiO_2$: ≥1%, preferably ≥1.5%, preferably ≥2%, and/or ≤5%, preferably ≤4%.

The unshaped concrete may also exhibit a composition, as percentages by weight and for a total of more than 97%, preferably for a total of more than 98%, indeed even for a total of more than 98.9%, such that:

$Al_2O_3$: 93%-97%,
$SiO_2$: 2%-4%.

In a preferred embodiment, the assembly ((a)+(b)+(c)) exhibits a composition, the remainder of which to 100% with $Al_2O_3$, $SiO_2$ and $ZrO_2$ is composed of CaO (which results conventionally from the presence of hydraulic cement) and of impurities. The impurities may, for example, be $Na_2O$, $K_2O$, metal particles and/or $TiO_2$.

The particles (a) may be formed from one or more sources of starting materials, exhibiting different chemical analyses. The particle size distributions of the particles may also differ according to said sources.

The following sources may in particular be used:

an fused-cast refractory product, such as Jargal M, produced and sold by the Société Européenne des Produits Réfractaires, exhibiting the following typical chemical analysis: $Al_2O_3$: 95%, $SiO_2$: 0.5%, $Na_2O$: 4%, others: 0.5%, the size of the particles of Jargal M preferably being greater than 50 µm and less than 10 mm;

fused-cast alumina, which is provided in the form of a powder, the particles of which have a size preferably of between 10 µm and 10 mm;

tabular alumina, which is provided in the form of a powder, the particles of which have a size preferably of between 10 µm and 10 mm;

calcined alumina, which is provided in the form of a powder, the particles of which have a size preferably of between 1 µm and 50 µm;

reactive alumina or a mixture of reactive aluminas, comprising more than 99% of $Al_2O_3$, it being possible for the median size of the particles of reactive alumina to preferably vary from 0.5 µm to 3 µm.

Preferably, the assembly of the particles (a) of the unshaped concrete:

exhibits a content by weight of alumina of greater than 92%, preferably greater than 95%, preferably greater than 98%, preferably greater than 99%, and/or represents more than 90%, preferably more than 91%, and/or less than 96%, preferably less than 94%, of the weight of the unshaped concrete, and/or comprises reactive alumina in an amount by weight of greater than 7%, greater than 10%, greater than 12%, and/or less than 18%, less than 16%, less than 15%, on the basis of the weight of the unshaped concrete, and/or comprises calcined alumina in an amount by weight of greater than 10%, greater than 14%, and/or of less than 25%, less than 22%, less than 20%, and/or comprises fused-cast alumina in an amount by weight of greater than 50%, greater than 55%, greater than 60%, and/or of less than 75%, less than 70%, less than 65%, on the basis of the weight of the unshaped concrete.

Preferably, the assembly of the particles (b) of the unshaped concrete:

exhibits a content by weight of silica of greater than 90%, indeed even greater than 92%, indeed even greater than 95%, and/or represents more than 2%, preferably more than 3%, and/or less than 6%, preferably less than 5%, of the weight of the unshaped concrete.

The assembly of the particles (b) is preferably a silica fume powder sold by the Société Européenne des Produits Réfractaires. This vitreous silica powder comprises more than 93% of silica ($SiO_2$), the particles having a size of between 0.1 and 5 µm and a median size of 0.5 µm.

Advantageously, the presence of silica makes it possible to reduce the amount of water necessary to render the fresh concrete flowable. It appears that the very fine silica particles are well distributed and subsequently make it possible to obtain good binding in the cured and sintered concrete. For this reason, it is considered that it is preferable to have between 3% and 5% of silica fume in an unshaped concrete according to the invention.

The assembly of particles (c) of hydraulic cement preferably constitutes more than 3% and/or less than 6% by weight of the unshaped concrete. The hydraulic cement (c) may be a high-alumina cement or a mixture of different cements. In order to limit the lime (CaO) content, it is preferable to use a cement having a high alumina content, such as the CA25 cement from Almatis. The CA25 cement comprises more than 78% of $Al_2O_3$ and less than 19% of CaO. The particles of the CA25 cement have a median size of approximately 8 µm.

Preferably, the alumina content of the hydraulic cement is greater than 60% by weight. More preferably, the hydraulic cement comprises, as main constituents, alumina and calcium aluminates.

The organic fibers (d) are, for example, polypropylene, polyacrylonitrile or polyvinyl alcohol fibers.

In one embodiment, the unshaped concrete comprises more than 0.01% of fibers. Preferably, the mean length (arithmetic mean) of these fibers is greater than 6 mm, preferably between 18 and 24 mm.

The presence of organic fibers makes it possible to improve the green strength of the cured concrete and limits the formation of cracks as it is being dried. Furthermore, the organic fibers are removed during the sintering or the phase of temperature rise of the furnace, thus creating a network of small channels which makes possible a more efficient evacuation of the water. However, these fibers are not essential.

Furthermore, the addition of fibers reduces the property of the fresh concrete to be self leveling. Above 0.03%, the presence of fibers prevents the fresh concrete from being self leveling. Preferably, the unshaped concrete comprises less than 0.03% of fibers, indeed even comprises substantially no fibers. In one embodiment, the unshaped concrete comprises less than 0.03% of fibers, indeed even comprises substantially no fibers exhibiting a length of greater than 6 mm, in particular between 18 and 24 mm.

Preferably, the unshaped concrete according to the invention also comprises at least one surface-active agent (e), preferably in a proportion of 0.1% to 1%, preferably of greater than or equal to 0.2%, and/or of less than 0.5%, more preferably less than 0.4%. The role of this surface-active agent is in particular to modify the rheological properties of the fresh concrete in order to facilitate the pumping thereof. Use is preferably made of surface-active agents chosen from long-chain sodium polyphosphates, sodium polyacrylates, ammonium polyacrylates, modified polycarboxylates and their mixtures. Preferably, the surface-active agents are chosen from modified polycarboxylates, preferably of modified polycarboxylate ether type, more preferably based on polyethylene glycol.

Preferably, the unshaped concrete according to the invention also comprises at least one setting accelerator (f), preferably in a proportion of 0.01% to 0.15%. The setting accelerators are well known by a person skilled in the art.

Particle Size Distribution

Preferably, the maximum size of the particles of unshaped concrete according to the invention is less than or equal to 10 mm, preferably less than or equal to 8 mm, preferably less than or equal to 5 mm.

In one embodiment, the fraction of the particles with a size of greater than 500 µm is greater than 40%, indeed even greater than 44%.

In one embodiment:
the fraction of the particles with a size of greater than 500 µm is greater than 40%, greater than 44% and less than 50%, and/or
the fraction of the particles with a size of greater than 1250 µm is greater than 8%, greater than 15%, greater than 19%, greater than 23% and less than 27%, and/or
the fraction of the particles with a size of greater than 2500 µm is greater than 4%, greater than 10%, greater than 13% and less than 17%.

Preferably, the fraction of the particles of the unshaped concrete with a size of less than 500 µm represents more than 50% by weight of said unshaped concrete.

Preferably, the fraction of the particles of the unshaped concrete with a size of between 40 µm and 500 µm is between 8% and 25%, is preferably greater than 9%, greater than 11% and/or less than 25%, less than 23%, less than 21%, less than 17%, less than 15%, on the basis of the weight of said unshaped concrete.

Preferably, the particles of the unshaped concrete are distributed in the following way, as percentages by weight:
fraction <0.5 µm: ≥5%, preferably ≥6% and/or ≤8%, and/or
fraction <2 µm: ≥7.5%, preferably ≥8%, preferably ≥10% and/or ≤16%, preferably ≤15%, preferably ≤13%, and/or -
fraction <10 µm: ≥25%, preferably ≥27% and/or ≤40%, preferably ≤35%, and/or
fraction <40 µm: ≥35%, preferably greater than 37% and/or ≤50%, preferably ≤47%, preferably less than 43%, and/or
fraction of between 2 µm and 40 µm: ≥27% and/or ≤32%, preferably ≤30%.

Preferably, the particles of the unshaped concrete are distributed in the following way:
fraction <0.5 µm: ≥5%
fraction <2 µm: 7.5%-16%
fraction <10 µm: ≥19%
fraction <40 µm: 34%-50%
fraction of between 2 µm and 40 µm: 26.5%-34%.

More preferably, the particles of the unshaped concrete are distributed in the following way:
fraction <0.5 µm: ≥6%
fraction <2 µm: 8%-15%
fraction <10 µm: 25%-40%
fraction <40 µm: 35%-47%
fraction of between 2 µm and 40 µm : 27%-32%.

Preferably still, the particles of the unshaped concrete are distributed in the following way:
fraction <0.5 µm: 6%-8%
fraction <2 µm: 10%-13%
fraction <10 µm: 27%-35%
fraction <40 µm: 37%-43%
fraction of between 2 µm and 40 µm: 27%-30%.

Without being committed to a theory, the inventors consider that a proportion of particles with a size of between 2 µm and 40 µm of between 26.5% and 34% facilitates the laying of the fresh concrete under its own weight, said particles promoting the displacement of the particles with respect to one another and preventing segregation. A proportion of particles with a size of between 2 µm and 40 µm of greater than 34% or less than 26.5% destroys the "self-leveling" nature of the fresh concrete.

Compaction models, such as the Fuller-Bolomey model or the Andreasen model, may be used to determine the most suitable particle size distribution.

An unshaped concrete according to the invention may be packaged in bags or in drums.

Preferably, the unshaped concrete is ready-for-use, that is to say incorporates all the constituents except water.

Use

In order to manufacture a fresh concrete starting from an unshaped concrete of the invention, the various components are intimately mixed with an amount of water (g) of between 5% and 9%, indeed even of less than 8% or less than 7%, as percentages by weight with respect to the weight of said unshaped concrete. The water content may be adjusted as a function of the concrete.

Advantageously, this fresh concrete may be transported directly into the glass furnace, for example in order to produce the floor underlayer, by flowing by gravity inside a shute. It may also be pumped using a piston pump. It may then be processed by simple vibration-free pouring.

The cured concrete according to the invention is then left to stand at ambient temperature. The rise in temperature of the furnace subsequently brings about sintering of the cured concrete and results in a cured and sintered concrete according to the invention. A sintering temperature of between 1000 and 1500° C. is highly suitable. If the cured concrete is sintered in a furnace, the time for maintaining at a stationary phase may be between 1 and 20 hours, preferably between 5 and 10 hours.

Preferably, the sintering is carried out in situ.

The unshaped concrete of the invention may also be used to manufacture shaped components having varied dimensions and which are in particular intended to be assembled in a glass furnace.

EXAMPLES

The nonlimiting examples which will follow are given for the purpose of illustrating the invention.

The "self-leveling" nature and the segregation are evaluated by the following test:

25 kg of fresh concrete are prepared in a mixer, with a mixing time of 15 minutes, and then poured into a preoiled hopper, in the form of a truncated pyramid, positioned to point down, and exhibiting a height of 320 mm, an inlet opening with an upper square cross section of 350 mm×350 mm and an outlet opening with a lower square cross section of 130×130 mm, initially closed by a trapdoor.

The trapdoor of the hopper is subsequently opened with a sharp movement and the fresh concrete flows under its own weight, through the outlet opening, into the upper end (at 700 mm from the ground) of a preoiled semicircular straight gutter made of PVC, exhibiting a diameter of 170 mm and a length of 1600 mm, the lower end of the gutter being at 380 mm from the ground.

The fresh concrete flows in the gutter and is poured into a mold positioned under the gutter, under the lower end of the gutter. The mold is a wooden mold having dimensions of 300 mm×300 mm×60 mm, which is oiled and positioned horizontally on the ground.

The fresh concrete is subsequently left to stand until it is cured in the form of a slab.

The thickness of the slab is measured on each of the four side faces of the slab, at both ends and at mid-length of the face.

The self-leveling ("SL") nature is acquired if the upper surface of the slab appears to be substantially smooth to the eye and if the difference "E" between the smallest thickness measured and the greatest thickness measured is less than or equal to 2 mm on each of the four side faces.

After stoving at 110° C. for 24 hours, the slab is sawn in two through its center, thus exposing two sawn faces. Segregation causes the coarsest particles to migrate, moving away from the upper face of the slab. It is considered that there is segregation when the sawn faces reveal a surface laitance layer extending, from the upper face of the slab, over a depth "e" of 3 mm or more.

The compositions of the particulate mixtures (a)+(b)+(c) are provided in table 1. The particle size distributions of the fused-cast alumina particles used are also shown.

The calcined aluminate used is the HVA FG alumina sold by Almatis.

The silica fume is a silica fume comprising more than 90% of silica by weight, being provided in the form of a powder, the particles of which have a size of between 0.1 and 5 µm and a median size of less than 0.6 µm, sold by the Société Européenne des Produits Réfractaires.

The cement used is CA25R cement, sold by Almatis.

The chemical compositions of the fresh concretes tested and also the results of the tests carried out are provided in table 2.

All the examples incorporate 0.2% of surface-active agent (long-chain sodium polyphosphate for the examples "Comp 1" to "Comp 3" and compound of the family of the modified polycarboxylate ethers for the other examples). The choice of a surfactant for the surfactants generally used by a person skilled in the art will be guided by the results of simple tests, such as those described in the present patent application, according to the performance levels desired (density of the cured concrete obtained, dilatometric properties of the cured concrete obtained). All the examples, except "Comp 1", "Comp 2" and "Comp 3", incorporate 0.1% of a setting accelerator: Silubit BL05, sold by Zchimmer & Schwarz.

In table 2, the remainder to 100% of $Al_2O_3$+$SiO_2$+$ZrO_2$+organic fibers+surface-active agent+setting accelerator is composed of CaO and of impurities.

The addition of water (g) is provided as percentage by weight on the basis of the unshaped concrete.

The distribution of the sizes of particles of less than 500 µm, measured using a Horiba laser particle sizer, is also provided in table 2.

TABLE 1

| | Particulate mixture (a) + (b) + (c), as percentages by weight | | | | | | |
|---|---|---|---|---|---|---|---|
| No. | Fused-case alumina 0.5 mm-3.5 mm | Fused-case alumina 10 µm-200 µm | Fused-case alumina 40 µm-1 mm | Calcined alumina | Reactive aluminas | Silica fume | Cement |
| Comp 1 | 55 | 25 | 0 | 6 | 0 | 8 | 6 |
| Comp 2 | 55 | 25 | 0 | 6 | 0 | 8 | 6 |
| Comp 3 | 55 | 25 | 0 | 6 | 0 | 8 | 6 |
| Comp 4 | 39 | 1 | 26 | 13 | 13 | 3 | 5 |
| 1 | 39 | 6 | 20 | 14 | 13 | 3 | 5 |
| 2 | 47 | 15 | 0 | 17 | 13 | 3 | 5 |
| 3 | 45 | 12 | 0 | 22 | 13 | 3 | 5 |
| 4 | 45 | 9 | 0 | 22 | 16 | 3 | 5 |
| Comp 5 | 44 | 10 | 0 | 25 | 13 | 3 | 5 |
| 5 | 47 | 15 | 0 | 17 | 13 | 3 | 5 |
| Comp 6 | 47 | 15 | 0 | 17 | 13 | 3 | 5 |

TABLE 2

| | Composition of the fresh concrete | | | | | | | | | |
|---|---|---|---|---|---|---|---|---|---|---|
| | Content as % by weight (on the basis of the unshaped concrete) | | | | Addition | | | | | |
| | | | | Organic | Water | % of particles of (a) + (b) + (c) | | | | |
| No. | $Al_2O_3$ | $SiO_2$ | $ZrO_2$ | fibers | (%) | <0.5 µm | <2 µm | <10 µm | <40 µm | <500 µm |
| Comp 1 | 90.8 | 7 | 0.2 | 0 | 4.5 | 3.9 | 8.4 | 15.6 | 22.2 | 45.7 |
| Comp 2 | 90.8 | 7 | 0.2 | 0 | 6.1 | 3.9 | 8.4 | 15.6 | 22.2 | 45.7 |
| Comp 3 | 90.8 | 7 | 0.2 | 0 | 6.1 | 3.9 | 8.4 | 15.6 | 22.2 | 45.7 |

TABLE 2-continued

| Comp 4 | 95.9 | 2.5 | 0.1 | 0    | 5.5 | 6.4 | 11   | 27.9 | 36.3 | 57.2 |
|--------|------|-----|-----|------|-----|-----|------|------|------|------|
| 1      | 95.8 | 2.5 | 0.1 | 0    | 5.6 | 6.4 | 11.1 | 28.7 | 37.6 | 58.1 |
| 2      | 96   | 2.5 | 0.1 | 0    | 5.9 | 7   | 11.3 | 31.2 | 39.5 | 53.8 |
| 3      | 96   | 2.5 | 0.1 | 0    | 5.7 | 6.4 | 11.4 | 35.1 | 43.6 | 55.6 |
| 4      | 96   | 2.5 | 0.1 | 0    | 6   | 7.2 | 12.7 | 37.8 | 46.2 | 55.6 |
| Comp 5 | 96   | 2.5 | 0.1 | 0    | 6.4 | 6.4 | 11.5 | 37.5 | 46.3 | 56.5 |
| 5      | 96   | 2.5 | 0.1 | 0.03 | 6.1 | 7   | 11.3 | 31.2 | 39.5 | 53.8 |
| Comp 6 | 96   | 2.5 | 0.1 | 0.04 | 6.3 | 7   | 11.3 | 31.2 | 39.5 | 53.8 |

| | % of particles | | Results of the tests | | | |
|---|---|---|---|---|---|---|
| No. | Between 2 and 40 μm | Between 40 and 500 μm | E (mm) | SL? | e (mm) | Segregation? |
| Comp 1 | 13.9 | 23.5 | 8 | No  | 0 | No  |
| Comp 2 | 13.9 | 23.5 | 2 | Yes | 5 | Yes |
| Comp 3 | 13.9 | 23.5 | 2 | Yes | 5 | Yes |
| Comp 4 | 25.3 | 20.9 | 4 | No  | 1 | No  |
| 1      | 26.5 | 20.5 | 2 | Yes | 0 | No  |
| 2      | 28.2 | 14.3 | 0 | Yes | 1 | No  |
| 3      | 32.2 | 12   | 1 | Yes | 1 | No  |
| 4      | 33.5 | 9.4  | 2 | Yes | 0 | No  |
| Comp 5 | 34.8 | 10.2 | 4 | No  | 1 | No  |
| 5      | 28.2 | 14.3 | 1 | Yes | 1 | No  |
| Comp 6 | 28.2 | 14.3 | 3 | No  | 0 | No  |

The results allow the following observations to be made:

The examples "Comp 1", "Comp 2" and "Comp 3" do not exhibit a segregation-free self-leveling nature.

A comparison of the examples "Comp 1" and "Comp 2" shows that an increase in the water content (changed from 4.5% to 6.1%) is not sufficient to give a segregation-free self-leveling nature to the fresh concrete. The "Comp 2" fresh concrete is self leveling but exhibits segregation. The increase in the water content may result in a deterioration in the properties of the cured concrete.

The example "Comp 4", which is outside the invention, exhibits a different particle size distribution from that of the example "Comp 1", with in particular a percentage of particles with a size of between 2 μm and 40 μm equal to 25.3%. This example does not exhibit a self-leveling nature.

Example 1, according to the invention, exhibits a similar particle size distribution to that of the example "Comp 4" but with a percentage of particles with a size of between 2 μm and 40 μm equal to 26.5%. Example 1 advantageously exhibits a segregation-free self-leveling nature.

Examples 2, 3 and 4, according to the invention, exhibit compositions similar to those of example 1, with a percentage of particles of between 2 μm and 40 μm equal to 28.2%, 32.2% and 33.5%, respectively. These examples also advantageously exhibit a segregation-free self-leveling nature.

The example "Comp 5", which is outside the invention, exhibits a composition similar to those of examples 1 to 4, with, however a percentage of particles of between 2 μm and 40 μm equal to 34.8%. This example does not exhibit a self-leveling nature.

Examples 2 and 5 show that a limited content of fibers of up to 0.03% does not damage the self-leveling nature. The example "Comp 6", which is outside the invention, shows, however, that a content of fibers of 0.04% suppresses the self-leveling nature.

The unshaped concrete of example 2 is the most preferred.

As is now clearly apparent, the invention provides an unshaped concrete which makes it possible to manufacture a "self-leveling" fresh concrete, that is to say a fresh concrete which may be laid without a vibration operation, and which does not result in segregation.

Furthermore, this fresh concrete may be pumped with suction pressures of less than or equal to 180 bar.

Finally, other tests have shown that a cured and sintered concrete according to the invention causes only few or no defects when it is in contact with molten glass.

A fresh concrete according to the invention thus makes it possible to manufacture, without a vibration operation, a cured and sintered concrete and in particular a floor, especially for a glass furnace, where the cured and sintered concrete comes into contact with molten glass. Despite the absence of a vibration operation, this cured and sintered concrete exhibits an excellent in-service behavior.

Of course, the present invention is not limited to the embodiments described, which are provided as illustrative and nonlimiting examples.

The invention claimed is:

1. An unshaped concrete configured for the preparation of a self-levelling fresh concrete, said unshaped concrete comprising, as percentages by weight,
    (a) 87% to 98% of particles comprising more than 90% by weight of alumina,
    (a) 1% to 7% of particles of silica fume,
    (c) more than 3% and up to 8% at most of particles of a hydraulic cement, the hydraulic cement comprising, as main constituents, alumina and calcium aluminates,
the fraction of said particles having a size of less than 40 μm being distributed, as percentages by weight with respect to the weight of the unshaped concrete, in the following way:
    fraction <0.5 μm: ≥4%,
    fraction <2 μm: ≥5%,
    fraction <10 μm: ≥19%,
    fraction <40 μm: 34%-52%,
provided that the percentage by weight, with respect to the weight of unshaped concrete, of the fraction of between 2 μm and 40 μm is between 26.5% and 34%, the content of $ZrO_2$, as percentage by weight on the basis of the unshaped concrete, being less than 2% and the content of organic fibers, as percentage by weight on the basis of the unshaped concrete, being less than or equal to 0.03%.

2. The unshaped concrete as claimed in claim 1, comprising from 0.075% to 1% of a surface-active agent and/or comprising a setting accelerator.

3. The unshaped concrete as claimed in claim 1, in which the hydraulic cement constitutes up to 6% of the weight of the unshaped concrete.

4. The unshaped concrete as claimed in claim 1, in which the particles of the unshaped concrete are distributed in the following way, as percentages by weight:
fraction <0.5 μm: ≥5% and/or
fraction <2 μm: ≥7.5% and/or
fraction <10 μm: ≥25% and/or
fraction <40 μm: ≥35% and ≤52%, and/or
fraction of between 2 μm and 40 μm: ≥27% and/or ≤32%.

5. The unshaped concrete as claimed in claim 1, in which the particles of the unshaped concrete are distributed in the following way, as percentages by weight:
fraction <0.5 μm: ≥6% and/or
fraction <2 μm: ≥8% and/or
fraction <10 μm: ≥27% and/or
fraction <40 μm: ≥37% ≤52%, and/or
fraction of between 2 μm and 40 μm: ≤30%.

6. The unshaped concrete as claimed in claim 1, in which the particles of the unshaped concrete are distributed in the following way, as percentages by weight:
fraction <0.5 μm: ≤8% and/or
fraction <2 μm: ≥10% and/or
fraction <10 μm: ≤40% and/or
fraction <40 μm: ≤50% and ≤34%.

7. The unshaped concrete as claimed in claim 1, in which the particles of the unshaped concrete are distributed in the following way, as percentages by weight:
fraction <2 μm: ≤16% and/or
fraction <10 μm: ≤35% and/or
fraction <40 μm: ≤47% and ≥34%.

8. The unshaped concrete as claimed in claim 1, in which the particles of the unshaped concrete are distributed in the following way, as percentages by weight:
fraction <2 μm: ≤15% and/or
fraction <40 μm: ≤43% and ≥34%.

9. The unshaped concrete as claimed in claim 1, in which the particles of the unshaped concrete are distributed in the following way, as percentages by weight:
fraction <2 μm: ≤13%.

10. The unshaped concrete as claimed in claim 1, which exhibits a $ZrO_2$ content of less than 1.5%.

11. The unshaped concrete as claimed in claim 10, which exhibits a $ZrO_2$ content of less than 1%.

12. The unshaped concrete as claimed in claim 11, which exhibits a $ZrO_2$ content of less than 0.5%.

13. The unshaped concrete as claimed in claim 1, which comprises for a total of more than 95% of the weight of said unshaped concrete:
$Al_2O_3$: 81.5%-98.5%
$SiO_2$: ≥0.8%.

14. The unshaped concrete as claimed in claim 1, which exhibits the composition by weight such that:
$Al_2O_3$: ≥93% and/or
$SiO_2$: ≥1.5%.

15. The unshaped concrete as claimed in claim 13, which exhibits the composition by weight such that:
$Al_2O_3$: ≤97% and/or
$SiO_2$: ≤4%.

16. The unshaped concrete as claimed in claim 1 in which the surface-active agent is a modified polycarboxylate ether.

17. The unshaped concrete as claimed in claim 1, in which the maximum size of the particles is less than or equal to 10 mm.

18. The unshaped concrete as claimed in claim 1, in which the fraction of the particles with a size of less than 500 μm represents more than 50% of the weight of said unshaped concrete.

19. The unshaped concrete as claimed in claim 1, in which the fraction of the particles with a size of between 40 μm and 500 μm is between 8% and 25%, with respect to the weight of said unshaped concrete.

* * * * *

UNITED STATES PATENT AND TRADEMARK OFFICE
CERTIFICATE OF CORRECTION

PATENT NO. : 10,611,688 B2
APPLICATION NO. : 14/380971
DATED : April 7, 2020
INVENTOR(S) : Thierry Claude Consales Page 1 of 1

It is certified that error appears in the above-identified patent and that said Letters Patent is hereby corrected as shown below:

In the Specification

Column 6, Line 24: Delete the words "well distributed" and insert therefor --well-distributed--

Column 6, Line 57: Delete the words "self leveling" and insert therefor --self-leveling--

Column 8, Line 62: Delete the word "preoiled" and insert therefor --pre-oiled--

Column 9, Line 4: Delete the word "preoiled" and insert therefor --pre-oiled--

Column 11, Line 33: Delete the words "self leveling" and insert therefor --self-leveling--

In the Claims

Column 12, Line 43: Delete the words "self-levelling" and insert therefor --self-leveling--

Signed and Sealed this
Thirteenth Day of October, 2020

Andrei Iancu
*Director of the United States Patent and Trademark Office*